US012604256B2

(12) United States Patent　(10) Patent No.: US 12,604,256 B2
Koshta et al.　(45) Date of Patent: Apr. 14, 2026

(54) UNIFIED ACCESS CONTROL FOR A CELLULAR NETWORK

(71) Applicant: Apple Inc., Cupertino, CA (US)

(72) Inventors: Nirlesh Koshta, Bangalore (IN); Vinay Mysore Viswanath, San Diego, CA (US); Anikethan Ramakrishna Vijaya Kumar, Mysuru (IN); Pradeep Pangi, Bengaluru (IN); Sridhar Prakasam, Fremont, CA (US)

(73) Assignee: Apple Inc., Cupertino, CA (US)

( * ) Notice: Subject to any disclaimer, the term of this patent is extended or adjusted under 35 U.S.C. 154(b) by 690 days.

(21) Appl. No.: 17/930,778

(22) Filed: Sep. 9, 2022

(65) Prior Publication Data

US 2023/0102956 A1　Mar. 30, 2023

(30) Foreign Application Priority Data

Sep. 24, 2021　(IN) ............................. 202141043425

(51) Int. Cl.
*H04W 48/02*　(2009.01)
*H04W 36/00*　(2009.01)
*H04W 60/00*　(2009.01)

(52) U.S. Cl.
CPC ..... *H04W 48/02* (2013.01); *H04W 36/00226* (2023.05); *H04W 60/00* (2013.01)

(58) Field of Classification Search
CPC ..... H04W 48/02; H04W 48/08; H04W 48/16; H04W 76/27; H04W 36/305; H04W 72/29; H04W 76/18; H04W 76/25; H04W 76/10
See application file for complete search history.

(56) References Cited

U.S. PATENT DOCUMENTS

| | | | | |
|---|---|---|---|---|
| 2019/0082376 A1* | 3/2019 | Hong | .................... | H04W 76/10 |
| 2020/0221369 A1* | 7/2020 | Adjakple | ............. | H04W 48/18 |
| 2020/0336953 A1* | 10/2020 | Liu | ....................... | H04W 48/02 |
| 2021/0092668 A1 | 3/2021 | Zaus et al. | | |
| 2021/0266811 A1 | 8/2021 | Hwang et al. | | |
| 2021/0266817 A1* | 8/2021 | Wallentin | ............. | H04W 48/08 |

(Continued)

FOREIGN PATENT DOCUMENTS

| | | |
|---|---|---|
| CN | 107079332 | 8/2017 |
| CN | 111587606 | 8/2020 |

(Continued)

OTHER PUBLICATIONS

Ericsson, "Access Control for NR", 3GPP TSG-RAN WG2 NR#2, Tdoc R2-1706505, Jun. 16, 2017, 5 sheets.

(Continued)

*Primary Examiner* — Kharye Pope
(74) *Attorney, Agent, or Firm* — Fay Kaplu & Marcin, LLP

(57) ABSTRACT

A user equipment (UE) is configured to determine a first access attempt to access a first network service is associated with a first access category, wherein the first access category is associated with a first Unified Access Control (UAC) rule, wherein the first UAC rule has a first priority and determine a second access attempt to access a second network service is associated with a second access category, wherein the second access category is associated with a second UAC rule, wherein the second UAC rule has a second priority.

11 Claims, 6 Drawing Sheets

(56)                References Cited

U.S. PATENT DOCUMENTS

| | | | | |
|---|---|---|---|---|
| 2023/0199618 A1* | 6/2023 | Ohlsson | ............... | H04W 48/10 |
| | | | | 370/328 |
| 2023/0247685 A1* | 8/2023 | Choe | .................... | H04W 76/10 |
| | | | | 370/329 |
| 2024/0056949 A1* | 2/2024 | Hong | ................... | H04W 76/25 |

FOREIGN PATENT DOCUMENTS

| | | | |
|---|---|---|---|
| JP | 2020-530695 | A | 10/2020 |
| KR | 2021/0052116 | | 5/2021 |
| WO | 2019/220234 | | 11/2019 |

OTHER PUBLICATIONS

CATT, "UE ProSe policy transmission", 3GPP TSG-CT WG1 Meeting #129-e, C1-212128, Apr. 12, 2021, 25 sheets.

NTT DOCOMO et al, "Unified Access Control for IMS registration related signalling", 3GPP Draft, C1-196981, Oct. 11, 2019, 21 sheets.

NTT DOCOMO et al., Unified Access Control for IMS registration related signalling, 3GPP TSG-CT WG1 Meeting #120, C1-196982, Oct. 11, 2019, 21 sheets.

Qualcomm Incorporated et al., "EPS Fallback Issues", 3GPP TSG RAN WG2 #107, R2-1909478, Aug. 16, 2019, 5 sheets.

NTT DOCOMO et al, "Unified Access Control for IMS registration related signalling", 3GPP TSG-CT WG1 Meeting #121, C1-198197, Nov. 1, 2019, 21 sheets.

ZTE, Sanechips, "Further consideration on AS/NAS modeling for unified access control", 3GPP TSG-RAN WG2 Meeting#101bis, R2-1804451, Apr. 6, 2018, 3 sheets.

* cited by examiner

UE 110

Table 300

Fig. 3

Method 400

Signaling Diagram 500

UNIFIED ACCESS CONTROL FOR A CELLULAR NETWORK

BACKGROUND

5G New Radio (NR) networks allow the network operator to define access barring rules. Specifically, the Third Generation Partnership (3GPP) TS 24.501 defines Operator Defined Access Control (ODAC) including the priority of various services in NR for determining an access category. As per the standard, the network provides ODAC information to a user equipment (UE) in a REGISTRATION ACCEPT or a CONFIGURATION UPDATE COMMAND message.

ODAC is defined in NR so that the network can specify the rules for access barring for specific PDU sessions, slice(s), OS App ID, Quality of Service (QoS), etc. This flexibility allows the network to control access attempts for any specific slice and/or PDU session which was absent in Long Term Evolution (LTE) networks. With various services and use cases still being explored in NR, this flexibility will allow networks to control traffic in an efficient manner.

However, with the introduction of ODAC there are impacts that need to be considered on other services such as Multimedia telephony (MMTEL) voice and/or video calls or IP Multimedia Subsystem (IMS) Registration when ODAC barring is applicable. This disclosure discusses some exemplary scenarios that will cause the UE to bar MMTEL voice, MMTEL video, IMS Registration, etc. when the UE has been ODAC access barred (e.g., for a specific PDU session or specific slice).

SUMMARY

Some exemplary embodiments are related to a processor of a user equipment (UE) configured to perform operations. The operations include determining a first access attempt to access a first network service is associated with a first access category, wherein the first access category is associated with a first Unified Access Control (UAC) rule, wherein the first UAC rule has a first priority and determining a second access attempt to access a second network service is associated with a second access category, wherein the second access category is associated with a second UAC rule, wherein the second UAC rule has a second priority.

Other exemplary embodiments are related to a processor of a user equipment (UE) configured to perform operations. The operations include performing an ongoing service with a first network comprising a first radio access technology (RAT), determining a radio link failure (RLF) has occurred for the first RAT and determining a second RAT is available to continue the ongoing service.

Still further exemplary embodiments are related to a processor of a user equipment (UE) configured to perform operations. The operations include determining a first access attempt to access a first network service is associated with a first access category, determining a second access attempt to access a second network service is associated with a second access category and selecting one of the first access category or the second access category for the first and second access attempts based on, at least, a predefined rule.

BRIEF DESCRIPTION OF THE DRAWINGS

FIG. 3 shows a mapping table for access categories in 5G NR that is provided in 3GPP TS 24.501 as Table 4.5.2.2.

DETAILED DESCRIPTION

Figure 1:
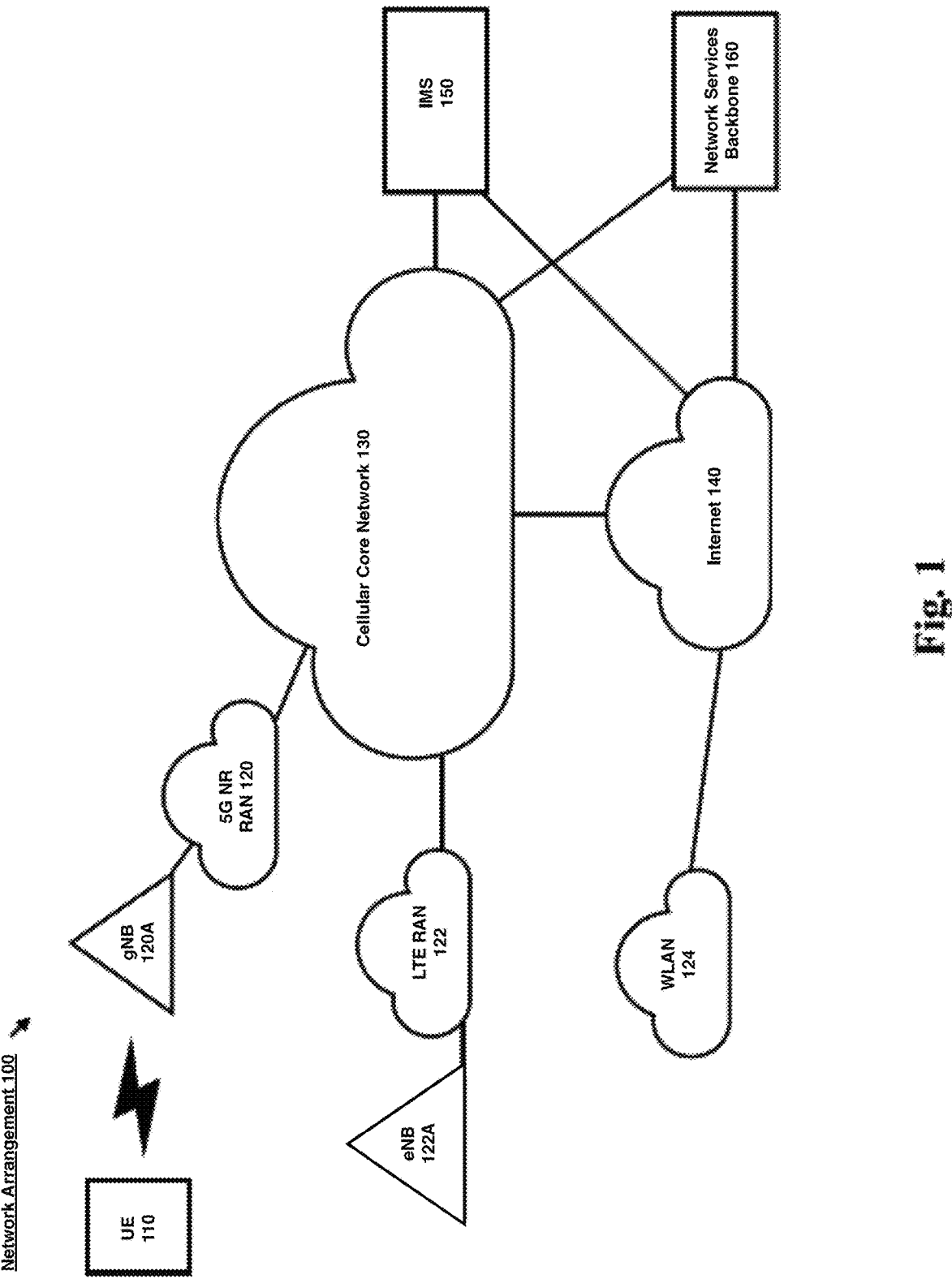
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments relate to access control for a UE to access various network services when some of the network services are access barred by the network operator.

The exemplary embodiments are described with regard to a fifth generation (5G) network that supports access barring. However, it should be understood that the exemplary embodiments may be applicable to any network that supports access barring in the manner described herein for the 5G networks.

The exemplary embodiments are described with reference to exemplary network services such as MMTEL voice, MMTEL video, MMTEL Short Messaging Services (SMS), IMS Registration, emergency calls, etc. However, it should be understood that these services are only exemplary and the exemplary embodiments may be applied to other network services. In addition, while the services are referred to as network services, it should be understood that some or all of the services may be provided by third parties and the network operator is providing access to the third party services.

In addition, throughout this description it will be described that a UE may be performing an access check for a Packet Data Unit (PDU) session on an Packet Data Network (PDN) or an access check for a network slice. Those skilled in the art will understand that the network and UE may configure one or more PDU sessions for the UE to access the network services via the PDN. The UE may also access the network services via a network slice, which refers to an end-to-end logical network that is configured to provide a particular service and/or possesses particular network characteristics. Thus, it should be understood that the terms PDU session and slice may be used interchangeably depending on how the UE is to access a particular network service. There may also be other manners of accessing the network services and it should be understood that the exemplary embodiments apply equally to other manners of accessing the network services.

In addition, throughout this description, the exemplary embodiments are described with respect to Operator Defined Access Control (ODAC) rules. Those skilled in the art will understand that there may be other types of access rules. These rules may be referred to as Unified Access Control (UAC) rules. The ODAC rules may be considered to be a subset of the UAC rules. It should be understood that the use of ODAC rules is only exemplary as any of the UAC rules may be used with the exemplary embodiments.

Some exemplary embodiments relate to a UE attempting multiple simultaneous access attempts for different network services. Some of these network services may be barred, which may result in all the access attempts being barred, even ones that should not be barred. The exemplary embodiments provide various manners of avoiding non-barred network services from being barred when there are multiple access attempts.

Other exemplary embodiments are related to situations where a network service is being provided via a first radio access technology (RAT) (e.g., Long Term Evolution (LTE) RAT) and a failure occurs such that the UE attempts to continue the service on a different RAT (e.g., 5G RAT). The continuation of the service on the different RAT may be access barred resulting in a poor user experience. The exemplary embodiments provide various manners of continuing the service on the second RAT.

Still further exemplary embodiments are related to situations where the UE encounters double barring scenarios. The exemplary embodiments provide various rules for handling double barring scenarios.

FIG. 1 shows an exemplary network arrangement 100 according to various exemplary embodiments. The exemplary network arrangement 100 includes a UE 110. It should be noted that any number of UE may be used in the network arrangement 100. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network arrangement 100, the networks with which the UE 110 may wirelessly communicate are a 5G New Radio (NR) radio access network (5G NR-RAN) 120, an LTE radio access network (LTE-RAN) 122 and a wireless local access network (WLAN) 124. However, it should be understood that the UE 110 may also communicate with other types of networks and the UE 110 may also communicate with networks over a wired connection. Therefore, the UE 110 may include a 5G NR chipset to communicate with the 5G NR-RAN 120, an LTE chipset to communicate with the LTE-RAN 122 and an ISM chipset to communicate with the WLAN 124.

The 5G NR-RAN 120 and the LTE-RAN 122 may be portions of cellular networks that may be deployed by cellular providers (e.g., Verizon, AT&T, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UE that are equipped with the appropriate cellular chip set. The WLAN 124 may include any type of wireless local area network (WiFi, Hot Spot, IEEE 802.11x networks, etc.).

The UE 110 may connect to the 5G NR-RAN 120 via the gNB 120A to receive network services from the 5G NR-RAN 120. The gNB 120A may be configured with the necessary hardware (e.g., antenna array), software and/or firmware to perform massive multiple in multiple out (MIMO) functionality. Massive MIMO may refer to a base station that is configured to generate a plurality of beams for a plurality of UE. During operation, the UE 110 may be within range of a plurality of gNBs. Reference to one gNB 120A is merely for illustrative purposes. The exemplary embodiments may apply to any appropriate number of gNBs. Further, the UE 110 may also connect and communicate with the eNB 122A of the LTE-RAN 122 to receive network services from the LTE-RAN 122.

Those skilled in the art will understand that any association procedure may be performed for the UE 110 to connect to the 5G NR-RAN 120 and/or LTE-RAN 122. For example, as discussed above, the 5G NR-RAN 120 and/or LTE-RAN 122 may be associated with a particular cellular provider where the UE 110 and/or the user thereof has a contract and credential information (e.g., stored on a SIM card). Upon detecting the presence of the 5G NR-RAN 120 and/or LTE-RAN 122, the UE 110 may transmit the corresponding credential information to associate with the 5G NR-RAN 120 and/or LTE-RAN 122. More specifically, the UE 110 may associate with a specific base station (e.g., the gNB 120A of the 5G NR-RAN 120 or the eNB 122A of the LTE-RAN 122).

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network.

The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
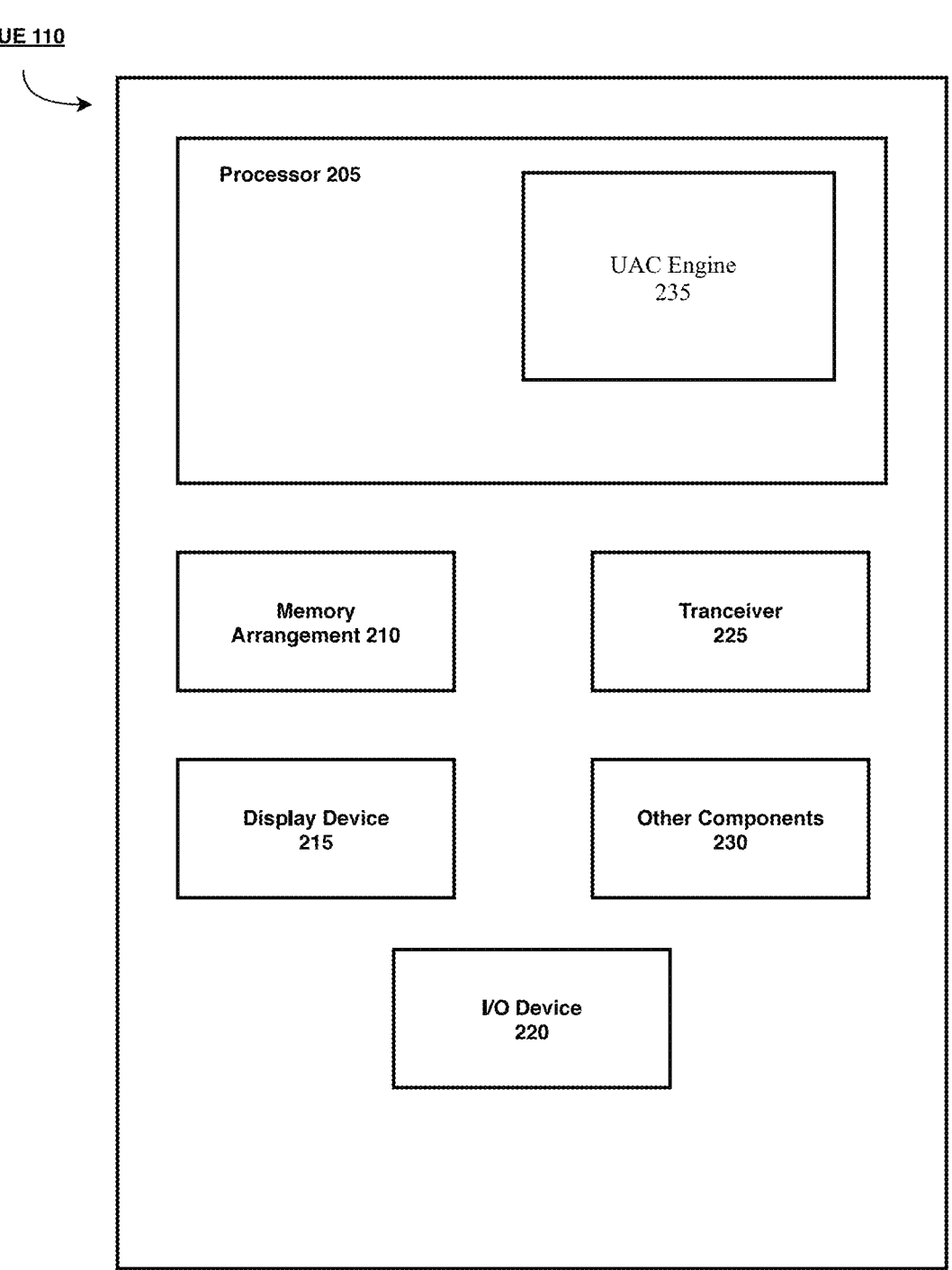
FIG. 2 shows an exemplary user equipment (UE) according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225 and other components 230. The other components 230 may include, for example, an audio input device, an audio output device, a battery that provides a limited power supply, a data acquisition device, ports to electrically connect the UE 110 to other electronic devices, one or more antenna panels, etc. For example, the UE 110 may be coupled to an industrial device via one or more ports.

The processor 205 may be configured to execute a plurality of engines of the UE 110. For example, the engines may include a unified access control (UAC) engine 235. The UAC engine 235 may perform various operations related to accessing network services via one or more of the available cellular networks (e.g., 5G NR-RAN 120, LTE-RAN 122, etc.) Exemplary operations performed by the UAC engine 235 will be described in greater detail below.

The above referenced engine being an application (e.g., a program) executed by the processor 205 is only exemplary. The functionality associated with the engine may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UE, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, the LTE-RAN 122, the WLAN 124, etc. Accordingly, the transceiver 225 may operate on a variety of different frequencies or channels (e.g., set of consecutive frequencies).

Figure 3:
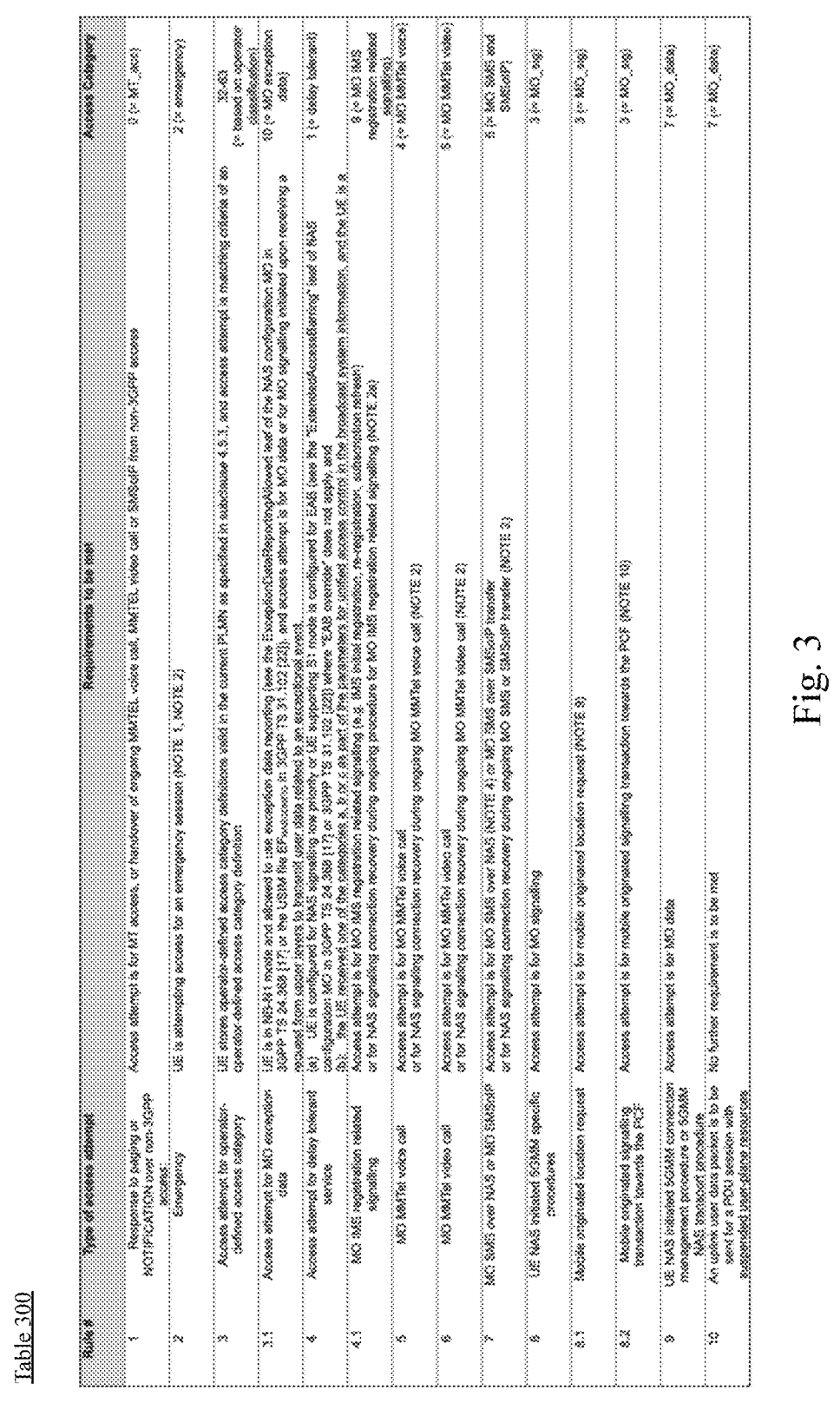

FIG. 3 shows a mapping table 300 for access categories in 5G NR that is provided in 3GPP TS 24.501 as Table 4.5.2.2. As shown in the mapping table 300, the first column includes an access barring rule number, the second column includes the type of access attempt, the third column includes the access requirements and the fourth column includes the access categories. It should be understood that the mapping table 300 of FIG. 3 is only used as an example and the exemplary embodiments are not limited to the specific rule numbers, access types and categories, etc., that are shown in FIG. 1.

An issue with access barring may arise because the current standards require that, if the access attempt matches more than one rule, the access category of the lowest rule number shall be selected. This means that the UE will select the ODAC access category having the lowest rule number among the PDU sessions that have data pending. If the access category associated with the lowest rule number is barred, all the pending PDU sessions will be barred, meaning that services that should not be barred will not be able to transmit the pending data.

The following provides an exemplary scenario of the access barring issue with respect to MMTEL voice barring when ODAC access barring is applicable for a PDU session. It may be considered that the UE 110 has received ODAC rules from the 5G NR-RAN 120, DNN:"Internet" (where DNN is Data Network Name) and IMS are activated and IMS Registration is successful. The ODAC rules may be defined for a specific DNN (e.g., DNN:"Internet") with access category AC:33, (e.g., AC:33 is access barred). The UE 110 may have uplink data pending for DNN:"Internet" and the 5G Mobility Management (5GMM) maps the access attempt to AC:33. Based on the ODAC rules, the UE 110 may determine that AC:33 is access barred and the pending data is not transmitted because of the access barring. However, the 3GPP standards also specify that the pending data for the PDU session that has failed the access check remains pending. Thus, after the UE 110 determines that AC:33 is access barred, the data pending in the PDU session for the DNN:"Internet" remains pending.

To continue with the example scenario, the access categories related to DNN:"IMS" include AC:4 for Mobile Originating (MO) MMTEL voice, AC:5 for MO MMTEL video, AC:6 for MO MMTEL Short Messaging Service (SMS) and SMS over Internet Protocol (SMSoIP), and AC:9 for IMS Registration. These access categories can be seen in the mapping table 300 of FIG. 3. In this example, it may also be considered that these access categories are not access barred.

Continuing with the exemplary scenario, the user may initiate an MMTEL voice call, but recall that the UE 110 still has pending UL data for DNN:"Internet". Thus, in this scenario there is data pending for multiple PDU sessions. As described above, when this scenario occurs the UE 110 will select the access category that has the lower rule number. As can be seen from the mapping table 300 of FIG. 3, AC:33 (DNN:"Internet") is associated with Rule #3 and AC:4 (MO MMTEL voice) is associated with Rule #5. Thus, the UE 110 will select AC:33 because it has the lower rule number. This selection of AC:33 will be for both the DNN:"Internet" and the MO MMTEL voice attempt. However, since AC:33 is access barred in this scenario, the UE 110 will not be able to attempt MMTEL voice calls on the 5G-NR RAN 120 and as per the handling may continue to remain on 5G-NR RAN. This will result in the user not being able to initiate voice calls on the 5G-NR RAN even when access barring for MMTEL voice is not applicable.

A second exemplary scenario showing the issue may arise when MO Signaling is access barred when ODAC access barring is applicable for a PDU session. For example, the UE 110 may have received ODAC rules from the network and DNN:"Internet" and "IMS are activated and IMS Registration is successful. The ODAC rules are defined for specific DNN (e.g., DNN:"Internet") with access category AC:33. The UE 110 has updated its configuration resulting in triggering of mobility registration (e.g., Discontinuous Reception Cycle (DRX) change, PDU session is locally deactivated, etc.) Similar to the above example, the UE 110 may have uplink data pending for DNN:"Internet" and the 5GMM maps the access attempt to AC:33. However, similar to the above example, the UE 110 determines that AC:33 is access barred and the pending mobility registration message is not transmitted but remains pending.

The UE 110 then initiates mobility registration (AC:3 (MO_signaling) is not access barred), but the UE 110 still has pending UL data for DNN:"Internet". Since AC:33 is associated with the lower ODAC rule than AC:3, the UE 110 will select AC:33 and the mobility registration cannot go through because AC:33 is access barred. This can result in issues where the UE 110 will not be able to update its configuration using mobility registration. This may result in the UE 110 missing network pages if the UE 110 cannot perform registration for more than the mobile network reachability duration.

The above paragraph shows exemplary scenarios where a service that should not be access barred is, in fact, access barred because of the selection of the access category with the lowest ODAC rule number. Based on the above example, those skilled in the art will understand that there may be many scenarios where this issue arises. The root cause of such issues is that by prioritizing ODAC rules, the UE 110 ends up access barring important services that should not be access barred. This can result in a bad user experience and also reduces the flexibility that the network has in assigning access categories rules for DNN, slice, QoS Rules, etc.

Figure 4:
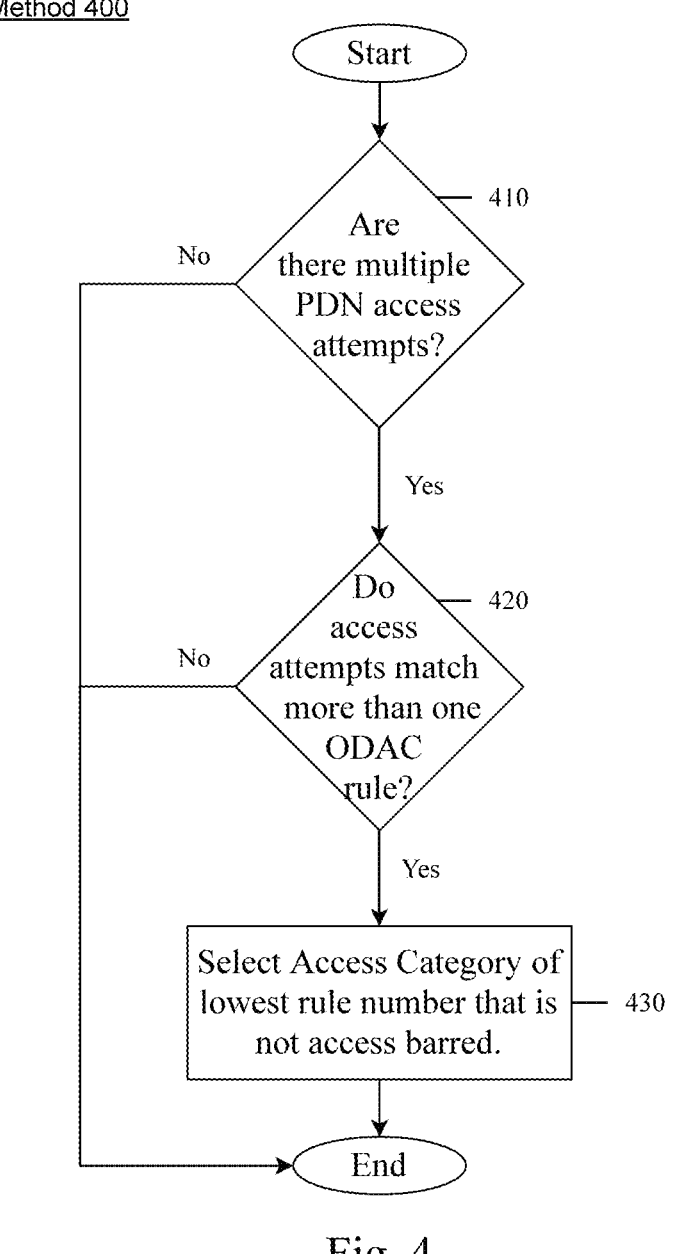
FIG. 4 shows an exemplary method for selecting an access category for multiple access attempts according to various exemplary embodiments.

FIG. 4 shows an exemplary method 400 for selecting an access category for multiple access attempts according to various exemplary embodiments. The exemplary method 400 resolves the issues associated with the selection of the access category described above in the exemplary scenarios. Specifically, the method 400 implements a further rule that, if the access attempt matches more than one rule, the access category of the lowest rule number that is not access barred shall be selected. This rule will be explained with reference to the method 400.

In 410, the UE 110 determines if there are multiple PDN access attempts. That is, if there is only a single access attempt, the rule of the method 400 does not apply. It should also be understood that while the method 400 is described with respect to a PDU access attempt, the method 400 is also applicable to other types of access attempts, e.g., slice(s), etc.

In 420, the UE 110 determines whether the multiple access attempts implicate more than one ODAC rule. That is, there may be multiple access attempts, but these attempts may all be associated with the same ODAC rule. Again, if multiple ODAC rules are not implicated by the multiple access attempts the rule of the method 400 does not apply.

In 430, the UE 110 will select the access category associated with the lowest ODAC rule number that is not access barred. Applying this rule to the first exemplary scenario described above, the UE 110 will not select the AC:33, but will select the AC:4 related to the MO MMTEL voice. That is, even though AC:33 is associated with the lower ODAC rule number, that access category is barred, so the UE 110 will move to the access category associated with next lowest rule number that is not access barred. Thus, the UE 110 will select the AC:4 because that access category is not barred. It should be understood that the exemplary scenarios describe scenarios with two (2) access attempts but the rule of method 400 can be extended to any number of access attempts.

It can be seen from the above that the rule of method 400 eliminates the root cause of the issue with the above scenarios, e.g., the prioritizing of the ODAC rules. By selecting an access category that is not access barred, the UE 110 avoids a service being access barred because an access barred category is selected.

In other exemplary embodiments, if the 5G NR-RAN 120 Network is providing an ODAC access category for a slice/PDU session, then the 5G NR-RAN 120 will provide the ODAC access category rules for all active slice/PDU sessions for the UE 110. These ODAC access category rules may be provided in the REGISTRATION ACCEPT or CONFIGURATION UPDATE COMMAND messages.

To provide an example with respect to the above exemplary scenarios, the 5G NR-RAN 120 would provide the access rules for both DNN:"IMS" and DNN:"Internet". This may be captured in the 3GPP specifications as follows, the network shall mandatorily provide ODAC rules "for all active PDU sessions or slices in the UE, for MO_SIGNAL-LING or other access categories. In addition, ODAC rule options may be introduced where the 5G NR-RAN 120 may provide ODAC access categories for MO_Signaling (Mobility registration) and MO_data so that the various services precedence can be decided by the UE 110 relatively among the ODAC rules for a DNN, slice or signaling.

It should be understood that by providing the UE 110 with the ODAC rules for the active PDU sessions, the UE 110 will understand which access categories are barred and may select access categories for services that are not barred that do not conflict with the barred access categories. Thus, these exemplary embodiments will also resolve the issues related to the prioritizing of the ODAC rules.

In addition to the above scenarios, there may also be scenarios where access checks cause a poor user experience when switching a voice call from a first radio access technology (RAT) to a second RAT (e.g., from the LTE-RAN 122 to the 5G NR-RAN 120) because of a radio link failure (RLF) on the first RAT. For example, based on the current 3GPP specifications, the UE 110 will perform access checks for MMTEL voice calls on the 5G NR-RAN 120 when an RLF is encountered during a voice call on the LTE-RAN 122 and the UE 110 recovers service on a suitable NR cell of the same Public Land Mobile Network (PLMN). The issue is that if the access check fails, the UE 110 will drop the voice call resulting in bad user experience. In addition, even if the access check does not fail, the access check will delay the MMTEL voice call setup also resulting in a poor user experience.

Figure 5:
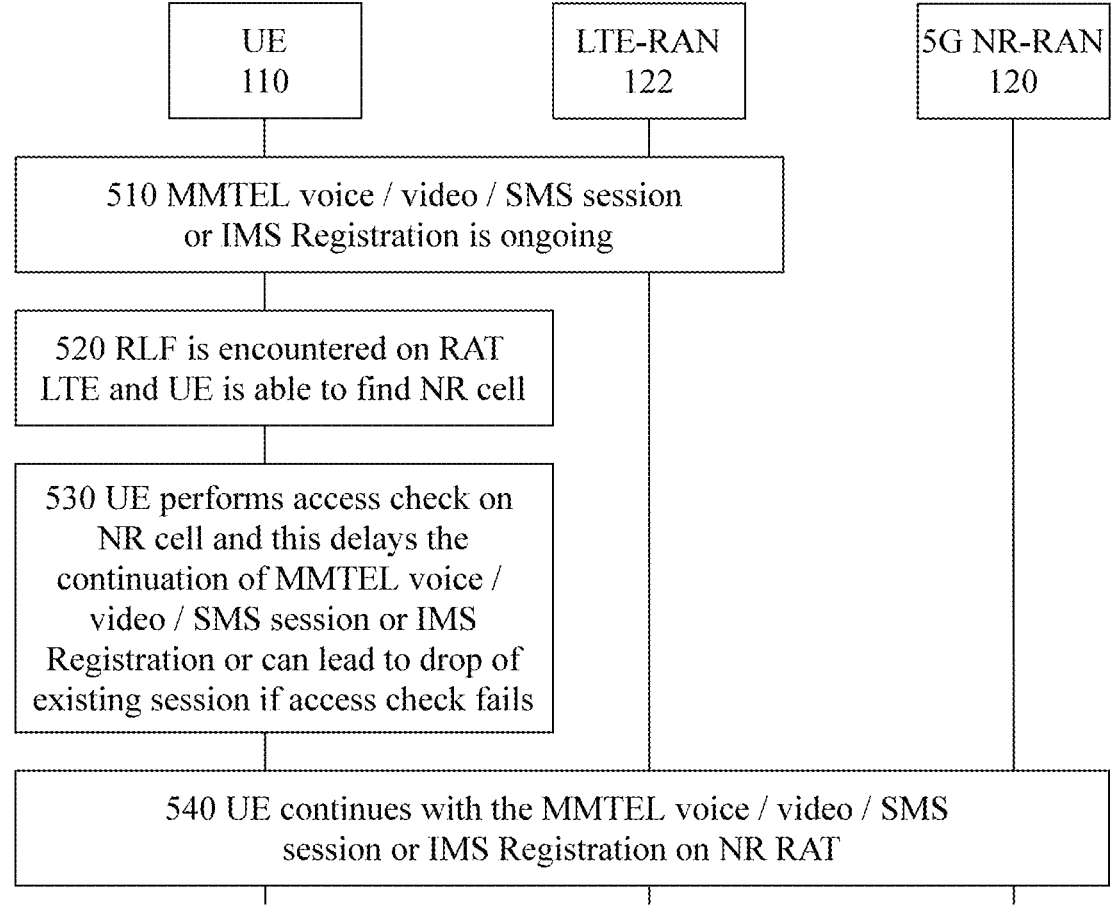
FIG. 5 shows an exemplary signaling diagram related to service recovery on a 5G NR-RAN during MMTEL voice/video or IMS Registration from an LTE-RAN.

FIG. 5 shows an exemplary signaling diagram 500 related to service recovery on the 5G NR-RAN 120 during MMTEL voice/video or IMS Registration from the LTE-RAN 122. In 510, the UE 110 has an active voice call on the LTE-RAN 122. At 520, the UE 110 encounters an RLF situation (e.g., the user moves to a new location where there is 5G coverage and not LTE coverage) and the voice call on the LTE-RAN 122 drops. However, the UE 110 detects a cell of the 5G NR-RAN 120 and camps on the cell. It may be considered that the cell of the 5G NR-RAN 120 supports Voice over NR (VoNR) service. In 530, the UE 110 will perform an access check for initiating a registration request over NR even when the MMTEL voice is ongoing. The application processor (AP) of the UE 110 will request the access check for the MMTEL voice to determine if the MMTEL voice call can be continued on the 5G NR-RAN 120. In 540, if the access check is successful, the UE 110 will continue the MMTEL voice call on the 5G NR-RAN 120. However, if the access check is not successful, the UE 110 will drop the active MMTEL voice call resulting in a poor user experience.

It should be understood that while the scenario shown in signaling diagram 500 was described with respect to a MMTEL voice call, as shown in the signaling diagram, the scenario may also apply to an MMTEL video call, an SMS session or IMS registration. Furthermore, the scenario may be reversed. For example, the UE 110 may have an active MMTEL voice/video/SMS session on the 5G NR-RAN 120 and experiences an RLF and the UE 110 may find a suitable LTE-RAN 122 cell. In addition, the scenario of FIG. 5 may also apply to emergency call handling where the access check results in an emergency call being dropped if emergency access check fails. Thus, it should be understood that the exemplary embodiments provided below that resolve these issues relates to access checks may apply to any of the described scenarios or any additional scenarios that have a similar issue as those described above.

In some exemplary embodiments, when there is a service recovery from a first RAT to a second RAT because of an RLF on the first RAT (e.g., from the LTE-RAN 122 to the 5G NR-RAN 120) for an ongoing service (e.g., an MMTEL voice call), the UE 110 may skip the access check for the access category. This may be captured in the 3GPP specifications as follows, access, for the purpose of Non-Access Stratum (NAS) signaling connection recovery during an ongoing service or for the purpose of NAS signaling connection establishment following a service recovery indication from lower layers during an ongoing service, is mapped to the access category of the ongoing service to derive an RRC establishment cause, but barring checks will be skipped for this access attempt. The same may be applied to IMS registration procedures.

Figure 6:
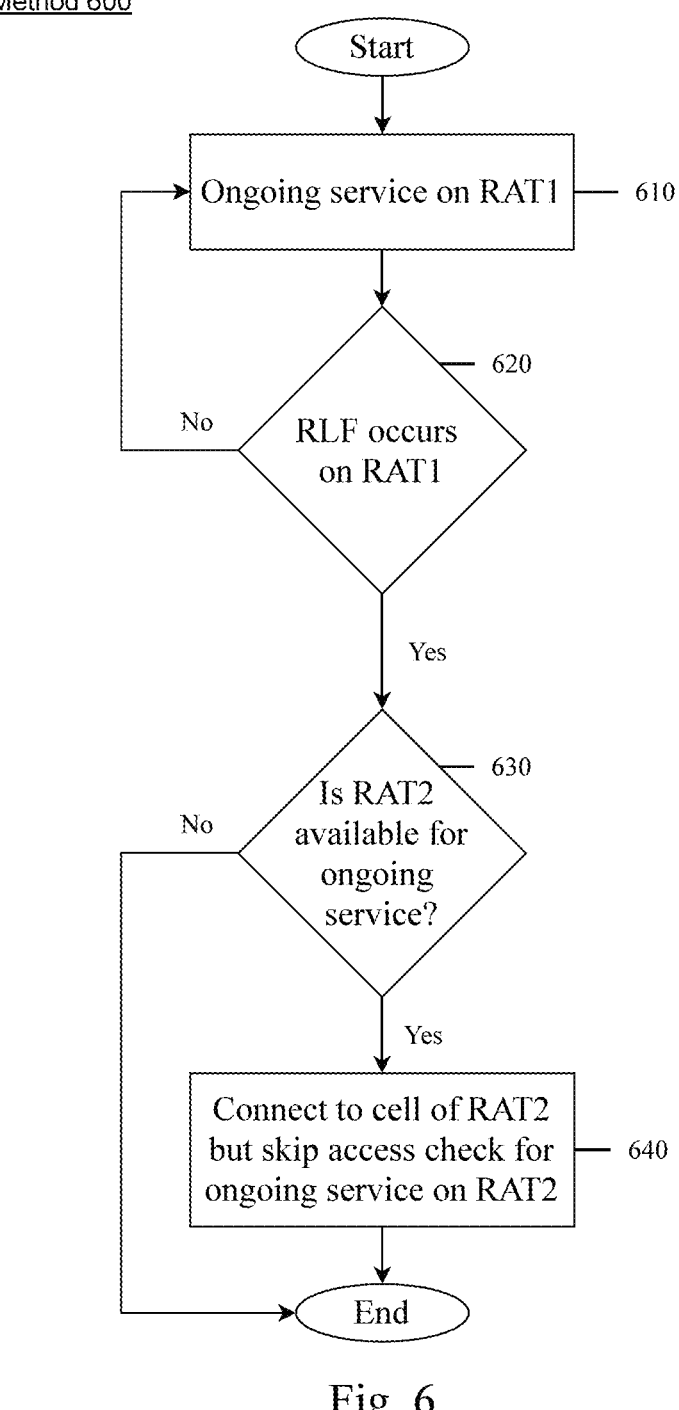
FIG. 6 shows an exemplary method for a service recovery from a first radio access technology (RAT) to a second RAT for an ongoing service according to various exemplary embodiments.

FIG. 6 shows an exemplary method 600 for a service recovery from a first radio access technology (RAT) to a second RAT for an ongoing service according to various exemplary embodiments. In the below description, the first RAT will be described as the LTE-RAN 122, the second RAT will be described as the 5G NR-RAN 120 and the ongoing service will be described as an MMTEL voice call. However, as was described above, the RATs may be switched (e.g., the service recovery may be from LTE to 5G) and the ongoing services may include any number of services including, but not limited to video calls, SMS, IMS registration, emergency calls, etc.

In 610, it may be considered that the UE 110 has an active MMTEL voice call using the LTE-RAN 122. In 620, the UE 110 determines whether an RLFG has occurred on the cell of the LTE-RAN 122. If no RLF has occurred, the voice call continues on the LTE-RAN 122. If an RLF has occurred, the UE 110, in 630, determines whether a suitable cell of the 5G NR-RAN 120 is available to continue the voice call. It should be noted that the RLF on the LTE-RAN 122 may be considered to indicate that there are no other cells of LTE-RAN 122 available to continue the voice call. As described above, a suitable cell of the 5G NR-RAN 120 may be considered a cell that supports VoNR services.

If there are no suitable cells on the 5G NR-RAN 120 available, the method 600 ends and the voice call is dropped. On the other hand, if a suitable cell on the 5G NR-RAN 120 is available, the UE 110, in 640, may perform an RRC connection establishment procedure (or any other appropriate procedure to connect to the 5G NR-RAN 120 cell) but skip the access check for the active voice call.

Thus, by skipping the access check in method 600 for the ongoing service, the UE 110 will avoid the issues described above for the service recovery procedure. Specifically, the ongoing service (e.g., voice call) will not be dropped if a suitable service recovery cell is available on another RAT because of being access barred. In addition, the skipping of the access check may also allow the service recovery connection to occur in a faster manner, which will also improve user experience.

In other exemplary embodiments, when the UE 110 is falling back to the 5G NR-RAN 120 to recover an ongoing service (e.g., MMTEL voice/video/SMS, IMS Registration, etc.), the UE 110 may consider the access category for the ongoing service as mobile terminating access (MT_access). Referring to table 300, it can be seen that MT_access is associated with AC:0 and UAC rule 1 is applied for continuing the access attempt on the 5G NR-RAN 120.

In still further exemplary embodiments, when the UE 110 is performing an RLF recovery on the LTE-RAN 122 with an ongoing MMTEL voice/video session, the lower layers can change the RRC establishment cause from "MO Signaling" to "MO Voice Call" when MMTEL voice session is active and UE 110 camps on a suitable LTE cell on RLF recovery.

In some scenarios, the UE 110 may encounter double barring. For example, in a first scenario the UE 110 may have on ongoing SMS over NAS (AC:6) transaction in parallel with a MO IMS registration signaling (AC:9). A service request or mobility registration procedure may be initiated in 5GMM-IDLE mode for the purpose of NAS signaling connection recovery or following a service recovery indication from the lower layers. The UE 110 is expected to map the access category to 9 (IMS REG).

In a second double barring scenario, an SMSoIP (AC:6) transaction is ongoing in parallel with an MO IMS registration signaling (AC:9). A service request or mobility registration procedure is initiated in 5GMM-IDLE mode for the purpose of NAS signaling connection recovery or following a service recovery indication from the lower layers. The UE 110 is expected to map the access category to 6 (SMS).

These expectations are based on the rules and the access categories described above with respect to table 300. Referring to table 300, MO IMS registration signaling is mapped to rule #4.1 & MO SMS over NAS (& MO SMSoIP) is mapped to rule #7. This implies IMS registration signaling has a higher priority than SMSoIP and SMS over NAS since, as discussed above, if the access attempt matches more than one rule, the access category of the lowest rule number shall be selected.

The exemplary embodiments propose a change such that double barring scenarios are handled as per priorities defined in the table 300 so that UE prioritizes SMS over NAS (user triggered service) compared to IMS REG signaling.

In a first rule, while an SMS over NAS is ongoing, no SMSoIP is ongoing, no MMTEL video call is ongoing and no MMTEL voice call is ongoing, any service request procedure or registration procedure initiated in 5GMM-IDLE mode or 5GMM-IDLE mode with suspend indication for the purpose of NAS signaling connection recovery or following a service recovery indication from the lower layers is mapped to access category 6.

In a second rule, while an MO IMS registration related signaling is ongoing, no SMS over NAS is ongoing, no SMSoIP is ongoing, no MMTEL video call is ongoing and no MMTEL voice call is ongoing any service request procedure related to the PDU session established for DNN="IMS" and for the DNN used for SMSoIP, if the upper layers have indicated a DNN used for SMSoIP and the indicated DNN used for SMSoIP is different from "IMS" is mapped to access category 9. The second rule continues, any uplink user data packet to be sent for a PDU session with suspended user-plane resources established for DNN="IMS" and for the DNN used for SMSoIP, if the upper layers have indicated a DNN used for SMSoIP and the indicated DNN used for SMSoIP is different from "IMS" is mapped to access category 9. The second rule further continues that any service request procedure or registration procedure initiated in 5GMM-IDLE mode for the purpose of NAS signaling connection recovery or following a service recovery indication from the lower layers is mapped to access category 9.

Examples

In a first example, a user equipment (UE) comprises a transceiver configured to communicate with a network and a processor communicatively coupled to the transceiver and configured to perform operations comprising determining a first access attempt to access a first network service is associated with a first access category, wherein the first access category is associated with a first Unified Access Control (UAC) rule, wherein the first UAC rule has a first priority and determining a second access attempt to access a second network service is associated with a second access category, wherein the second access category is associated with a second UAC rule, wherein the second UAC rule has a second priority.

In a second example, a user equipment (UE) comprises a transceiver configured to communicate with a network and a processor communicatively coupled to the transceiver and configured to perform operations comprising performing an ongoing service with a first network comprising a first radio access technology (RAT), determining a radio link failure (RLF) has occurred for the first RAT and determining a second RAT is available to continue the ongoing service.

In a third example, a user equipment (UE) comprises a transceiver configured to communicate with a network and a processor communicatively coupled to the transceiver and configured to perform operations comprising determining a first access attempt to access a first network service is associated with a first access category, determining a second access attempt to access a second network service is associated with a second access category and selecting one of the first access category or the second access category for the first and second access attempts based on, at least, a predefined rule.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. The exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

We claim:

1. A processor of a user equipment (UE) configured to perform operations comprising:

determining a first access attempt to access a first network service is associated with a first access category, wherein the first access category is associated with a first Unified Access Control (UAC) rule, wherein the first UAC rule has a first priority, wherein the first network service is a Short Messaging Service (SMS) over Non-Access stratum (NAS), and wherein the first network service is ongoing and a mobile originating (MO) IP Multimedia Subsystem (IMS) is ongoing;

determining a second access attempt to access a second network service is associated with a second access category, wherein the second access category is associated with a second UAC rule, wherein the second UAC rule has a second priority, wherein the second network service is one of a service request procedure or a registration procedure, and wherein the first and second access attempts are initiated in 5G Mobility Management Idle (5GMM-IDLE) mode or 5GMM-IDLE mode with suspend indication for a purpose of NAS signaling connection recovery or following a service recovery indication from lower layers of the UE; and selecting one of the first access category or the second access category for the first and second access attempts based on, at least, a predefined rule indicating that an access category 6 is to be selected for the first and second access attempts when SMS over NAS is ongoing and MO IP IMS is ongoing.

2. The processor of claim 1, wherein the operations further comprise:

receiving, from a network, the first and second UAC rules based on the UE having one of an active PDU session or active network slice related to the first and second network services.

3. The processor of claim 2, wherein the selecting is further based on, at least, the first and second UAC rules.

4. The processor of claim 1, wherein the first and second network services are associated with one of an active protocol data unit (PDU) session or an active network slice.

5. A processor of a user equipment (UE) configured to perform operations comprising:

determining a first access attempt to access a first network service is associated with a first access category, wherein the first network service is a Short Messaging Service (SMS) over Non-Access stratum (NAS), and wherein the first network service is ongoing and a mobile originating (MO) IP Multimedia Subsystem (IMS) is ongoing;

determining a second access attempt to access a second network service is associated with a second access category, wherein the second network service is one of a service request procedure or a registration procedure, and wherein the first and second access attempts are initiated in 5G Mobility Management Idle (5GMM-IDLE) mode or 5GMM-IDLE mode with suspend indication for a purpose of NAS signaling connection recovery or following a service recovery indication from lower layers of the UE; and selecting one of the first access category or the second access category for the first and second access attempts based on, at least, a predefined rule indicating that an access category 6 is to be selected for the first and second access attempts when SMS over NAS is ongoing and MO IP IMS is ongoing.

6. The processor of claim 1, wherein no SMS over Internet Protocol (SMSoIP) is ongoing.

7. The processor of claim 1, wherein no Multimedia telephony (MMTEL) voice service is ongoing.

8. The processor of claim 5, wherein the operations further comprise:

receiving, from a network, the predefined rule based on the UE having one of an active PDU session or active network slice related to the first and second network services.

9. The processor of claim 5, wherein the first and second network services are associated with one of an active protocol data unit (PDU) session or an active network slice.

10. The processor of claim 5, wherein no SMS over Internet Protocol (SMSoIP) is ongoing.

11. The processor of claim 5, wherein no Multimedia telephony (MMTEL) voice service is ongoing.

\* \* \* \* \*